US012798910B2

(12) United States Patent
Jones, Jr. et al.

(10) Patent No.: US 12,798,910 B2
(45) Date of Patent: Nov. 17, 2026

(54) HOLD-DOWN BRACKET FOR PIT DOCK LEVELER

(71) Applicant: OVERHEAD DOOR CORPORATION, Lewisville, TX (US)

(72) Inventors: Kip A. Jones, Jr., State College, PA (US); Jared W. Eller, Grapevine, TX (US)

(73) Assignee: Overhead Door Corporation, Lewisville, TX (US)

( * ) Notice: Subject to any disclaimer, the term of this patent is extended or adjusted under 35 U.S.C. 154(b) by 320 days.

(21) Appl. No.: 18/758,519

(22) Filed: Jun. 28, 2024

(65) Prior Publication Data

US 2026/0001735 A1 Jan. 1, 2026

(51) Int. Cl.
*B65G 69/28* (2006.01)

(52) U.S. Cl.
CPC ..... *B65G 69/2835* (2013.01); *B65G 69/2876* (2013.01)

(58) Field of Classification Search
CPC ........................ B65G 69/2835; B65G 69/2876
USPC ........................................................... 14/71.1
See application file for complete search history.

(56) References Cited

U.S. PATENT DOCUMENTS

| | | | |
|---|---|---|---|
| 2,644,971 | A | 7/1953 | Rowe |
| 3,071,790 | A | 1/1963 | Le Clear |
| 3,137,017 | A | 6/1964 | Pfleger |
| 3,235,896 | A | 2/1966 | Willie |
| 3,316,575 | A | 5/1967 | Larsen |
| 3,323,158 | A | 6/1967 | Loomis |
| 3,334,368 | A | 8/1967 | Mcintosh |
| 3,368,229 | A | 2/1968 | Pfleger |
| 3,411,168 | A | 11/1968 | Hecker, Jr. |
| 3,460,175 | A | 8/1969 | Beckwith |
| 3,475,778 | A | 11/1969 | Merrick |
| 3,486,181 | A | 12/1969 | Hecker, Jr. |
| 3,493,984 | A | 2/1970 | Reinhard |
| 3,500,486 | A | 3/1970 | Le Clear |
| 3,516,103 | A | 6/1970 | Hecker, Jr. |
| 3,570,033 | A | 3/1971 | Hovestad |
| 3,583,014 | A | 6/1971 | Brown |
| 3,587,126 | A | 6/1971 | Potter |
| 3,636,578 | A | 1/1972 | Dieter |
| 3,646,627 | A | 3/1972 | Potter |
| 3,665,538 | A | 5/1972 | Smith |
| 3,766,585 | A | 10/1973 | Yoon |
| 3,786,530 | A | 1/1974 | Leclear |
| 3,835,497 | A | 9/1974 | Smith |
| 3,839,761 | A | 10/1974 | Stevenson |
| 3,858,264 | A | 1/1975 | Kuhns |

(Continued)

OTHER PUBLICATIONS

US 9,376,274 B1, 06/2016, Stone (withdrawn)

*Primary Examiner* — Raymond W Addie
(74) *Attorney, Agent, or Firm* — Haynes and Boone, LLP

(57) ABSTRACT

A bracket may temporarily hold a dock leveler in a stowed position, such as during transportation or storage. One embodiment may include a bracket. The bracket may include a top portion, a bottom portion, and a main body. The top portion may include a hook shaped to couple proximate to a top end of a lip of the dock leveler when the lip is in the stowed position. The bottom portion may be configured to couple to a lip keeper or frame of the dock leveler. The main body may extend between the top portion and the bottom portion and may be configured to span a length of the lip to hold the dock leveler in the stowed position.

22 Claims, 5 Drawing Sheets

(56) References Cited

U.S. PATENT DOCUMENTS 3,882,563 A 5/1975 Smith
3,883,917 A 5/1975 Alten
3,921,241 A 11/1975 Smith
3,967,337 A 7/1976 Artzberger
3,974,537 A 8/1976 Ellis
3,982,295 A 9/1976 Burnham
3,997,932 A 12/1976 Artzberger
4,014,059 A 3/1977 Artzberger
4,065,824 A 1/1978 Ellis
4,068,338 A 1/1978 Artzberger
4,081,874 A 4/1978 Artzberger
4,091,488 A 5/1978 Artzberger
4,126,909 A 11/1978 Smith
RE30,104 E 10/1979 Burnham
4,257,137 A 3/1981 Hipp
4,398,315 A 8/1983 Driear
4,402,100 A 9/1983 Slusar
4,455,703 A 6/1984 Fromme
4,525,887 A 7/1985 Erlandsson
4,531,248 A 7/1985 Swessel
4,570,277 A 2/1986 Hahn
4,665,579 A 5/1987 Bennett
4,689,846 A 9/1987 Sherrod
4,703,534 A 11/1987 Pedersen
4,776,052 A 10/1988 Delgado
4,847,935 A 7/1989 Alexander
4,865,507 A 9/1989 Trickle
4,935,979 A 6/1990 Walker
4,937,906 A 7/1990 Alexander
4,974,276 A 12/1990 Alexander
5,040,258 A 8/1991 Hahn
5,117,526 A 6/1992 Alexander
5,123,135 A 6/1992 Cook
5,195,205 A 3/1993 Cook
5,214,818 A 6/1993 Cook
5,274,867 A 1/1994 Hageman
5,303,443 A 4/1994 Alexander
5,311,628 A 5/1994 Springer
5,317,775 A 6/1994 Das Dores
5,343,583 A 9/1994 Cook
5,440,772 A 8/1995 Springer
5,450,643 A 9/1995 Warner
5,551,113 A 9/1996 Marler
5,560,063 A 10/1996 Alten
5,586,355 A 12/1996 Metz
5,621,938 A 4/1997 Warner
5,644,812 A 7/1997 Neufeldt
5,657,502 A 8/1997 Ellis
6,061,859 A 5/2000 Winter
6,085,375 A 7/2000 Holm
6,098,227 A 8/2000 Meichtry
6,112,353 A 9/2000 Winter
6,125,491 A 10/2000 Alexander
6,163,913 A 12/2000 Disieno
6,205,606 B1 3/2001 Zibella
6,240,587 B1 6/2001 Meichtry
6,327,733 B1 12/2001 Alexander
6,368,043 B1 4/2002 Leum
6,405,397 B1 6/2002 Alexander
6,442,783 B1 9/2002 Yoon
6,473,926 B2 11/2002 Lounsbury
6,481,038 B2 11/2002 Lounsbury
6,487,741 B2 12/2002 Alexander
6,629,328 B2 10/2003 Widule
6,711,774 B2 3/2004 Hodges
6,760,944 B2 7/2004 Hodges
6,769,149 B2 8/2004 Alexander
6,820,295 B2 11/2004 Webster
6,834,409 B2 12/2004 Gleason
6,892,411 B1 5/2005 Yoon
6,910,239 B2 6/2005 Hodges
6,931,686 B2 8/2005 Hoofard
6,951,041 B2 10/2005 Hoofard
6,973,693 B1 12/2005 Mayer
6,988,289 B2 1/2006 Pedersen
7,013,519 B2 3/2006 Gleason
7,017,220 B2 3/2006 Alexander
7,032,267 B2 4/2006 Mitchell
7,043,790 B2 5/2006 Alexander
7,047,584 B2 5/2006 Hoofard
7,062,813 B2 6/2006 Hoofard
7,100,233 B2 9/2006 Alexander
7,131,160 B2 11/2006 Alexander
7,134,159 B2 11/2006 Muhl
7,162,761 B2 1/2007 Alexander
7,213,285 B2 5/2007 Mitchell
7,213,286 B2 5/2007 Hoofard
7,216,392 B2 5/2007 Hoofard
7,225,493 B2 6/2007 Hoofard
7,353,558 B2 4/2008 Alexander
7,363,670 B2 4/2008 Mitchell
7,409,739 B2 8/2008 Whitley
D579,754 S 11/2008 Gleason
7,546,655 B2 6/2009 Mitchell
7,657,957 B2 2/2010 Alexander
7,865,992 B1 1/2011 Ion
7,926,140 B2 4/2011 Whitley
7,996,943 B2 8/2011 Wallis
8,132,280 B2 3/2012 Gleason
8,141,189 B2 3/2012 Mitchell
8,327,486 B2 12/2012 Fontaine
8,407,842 B2 4/2013 Story
8,544,130 B2 10/2013 Sveum
8,627,529 B1 1/2014 Palmersheim
9,150,368 B2 10/2015 Hodges
9,284,135 B2 3/2016 Sveum
9,546,056 B2 1/2017 Stone
9,938,094 B1 4/2018 Leum
9,944,475 B1 4/2018 Leum
10,040,646 B2 8/2018 Yule
10,597,242 B1 3/2020 Sivakumar
11,273,999 B1 3/2022 Leum
11,511,954 B2 11/2022 Leum
2005/0011020 A1 1/2005 Alexander
2005/0132512 A1 6/2005 Muhl
2005/0160540 A1 7/2005 Hoofard
2005/0251934 A1 11/2005 Yoon
2005/0273949 A1 12/2005 Gleason
2006/0042030 A1 3/2006 Yoon
2006/0045678 A1 3/2006 Andersen
2006/0156493 A1 7/2006 Alexander
2007/0017043 A1 1/2007 Alexander
2007/0017044 A1 1/2007 Alexander
2007/0226923 A1 10/2007 Alexander
2015/0013083 A1 1/2015 Palmersheim
2017/0073176 A1 3/2017 Yule
2022/0332528 A1 10/2022 Shahbazian
2023/0365358 A1 11/2023 Mellits
2023/0365359 A1 11/2023 Mellits
2023/0365360 A1 11/2023 Mellits
2024/0409329 A1 12/2024 Maggio
2024/0409330 A1 12/2024 Gamliel
2024/0409333 A1 12/2024 Eller
2024/0409336 A1 12/2024 Eller
2024/0409343 A1 12/2024 Maggio

HOLD-DOWN BRACKET FOR PIT DOCK LEVELER

TECHNICAL FIELD

The present disclosure relates generally to dock levelers for bridging the gap between a loading dock and a bed of a truck, trailer, or other transport and, specifically a hold-down bracket for storing and shipping or transporting a dock leveler.

BACKGROUND

Loading dock levelers, such as mechanical dock levelers, hydraulic dock levelers, air dock levelers, and vertical dock levers, are used to bridge the gap and height difference between a loading dock and a trailer, truck bed, or other transport. The loading dock levelers also compensate for up and down float of the transport during loading and unloading. Typically, dock levelers are installed in a pit that is formed in the loading dock allowing for upward and downward movement from the dock floor to the transport.

Dock levelers may include a deck that extends from one end of the pit to the other and a lip rotatably coupled to the deck that contacts the trailer or truck bed, thereby forming a bridge between the trailer or truck bed and the deck. In some cases, the dock leveler may bias the deck and/or lip upward. The user may then adjust the deck and/or lip downward to match the height of the trailer or truck bed.

Before installing the dock leveler, a stowing mechanism may be used to hold the dock leveler in a stowed position. For example, the dock leveler may be in a stowed position when storing, shipping, or transporting the dock leveler. In some cases, the dock leveler may be stowed such that the deck is generally horizontal to the ground and the lip is generally vertical to the ground. However, in the stowed position, the stowing mechanism may need to resist the upward and/or downward biasing force of the dock leveler to prevent the deck and/or lip from moving upward and out of the stowed position. In some cases, steel bands may be wrapped around one or more parts of the dock leveler to hold the dock leveler in the stowed position.

This disclosure is directed to innovative and new storage mechanisms for dock levelers that are easy to install, include a small number of parts, and counteract the biasing force(s) of the dock leveler to maintain it in a stowed position.

SUMMARY

One embodiment of the present disclosure may include a bracket for holding a dock leveler in a stowed position. The bracket may include a top portion, a bottom portion, and a main body. The top portion may include a hook shaped to couple proximate to a top end of a lip of the dock leveler when the lip is in the stowed position. The bottom portion may be configured to couple to a lip keeper or a frame of the dock leveler. The main body may extend between the top portion and the bottom portion and may be configured to span a length of the lip to hold the dock leveler in the stowed position.

In some embodiments, the bracket may be a single piece. In some embodiments, the bottom portion may include a hole shaped to receive a fastener usable to secure the bottom portion to the lip keeper or frame. In some embodiments, the bracket may have a first piece including the top portion and a first part of the main body and a second piece including the bottom portion and a second part of the main body. In some embodiments, one of the first piece or the second piece may include a first adjustment hole and the other of the first piece or second piece may include a plurality of second adjustment holes. In some embodiments, the first adjustment hole may be couplable to a second adjustment hole of the plurality of second adjustment holes by a bolt and a nut. In some embodiments, each second adjustment hole of the plurality of second adjustment holes may be longitudinally spaced from the other second adjustment holes of the plurality of second adjustment holes. In some embodiments, the hook may include a first vertical portion, a second vertical portion, and a horizontal portion extending between the first vertical portion and the second vertical portion such that the first vertical portion is spaced from the second vertical portion. In some embodiments, a length of the horizontal portion may be greater than a thickness of the lip. In some embodiments, the top portion may include one or more indicators indicating a length of the bracket. In some embodiments, the one or more indicators may be indicator holes. In some embodiments, the main body may include one of a sheet metal, a strap, a wire, or a cable One embodiment of the present disclosure may include a system, including a dock leveler and a bracket. The dock leveler may include a lip, a lip keeper, and a biasing mechanism. The lip may include a first end and an opposite second end. The lip keeper may include a lip holder, the lip keeper being attached to a frame of the dock leveler, the lip keeper or frame having a first connector. The biasing mechanism may bias the dock leveler upward into an extended position. The bracket may be configured to maintain the dock leveler in the stowed position. The bracket may include a top portion comprising a hook coupled proximate to the first end of the lip and a bottom portion comprising a second connector cooperative with the first connector to couple the bracket to the lip keeper or frame.

In some embodiments, the lip keeper may include a notch configured to couple to the second end of the lip, and the first connector may be located forward of the notch. In some embodiments, the first connector may be located below a bottom of the notch. In some embodiments, the second connector of the bottom portion of the bracket may be coupled to the first connector of the lip keeper or frame via a nut and a bolt. In some embodiments, the hook of the top portion of the bracket may include a first vertical portion, a second vertical portion, and a horizontal portion extending between the first vertical portion and the second vertical portion such that the first vertical portion is spaced from the second vertical portion. In some embodiments, a length of the horizontal portion may be greater than a thickness of the lip. In some embodiments, the first vertical portion may be disposed on a first side of the lip and the second vertical portion may be disposed on a second side of the lip such that the horizontal portion extends across the first end of the lip.

One embodiment of the present disclosure may include a method of holding a dock leveler in a stowed position. The method may include the step of coupling a top portion of a bracket at a location proximate to a first end of a lip of the dock leveler. The top portion of the bracket may include a hook that hooks proximate to the first end of the lip. The method may also include the step of aligning a first connector of a bottom portion of the bracket with a second connector on a lip keeper or frame of the dock leveler. The lip keeper may be engaged with a second end of the lip. The method may also include the step of securing the bottom portion of the bracket to the lip keeper or frame using the first connector of the bottom portion and the second connector of the lip keeper or frame.

In some embodiments, coupling the top portion of the bracket at the location proximate to the first end of the lip may include non-fixedly securing the top portion of the bracket to the first end of the lip. In some embodiments, securing the bottom portion of the bracket to the lip keeper or frame may include fixedly securing the bottom portion of the bracket to the lip keeper or frame. In some embodiments, the first connector and the second connector may be holes.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
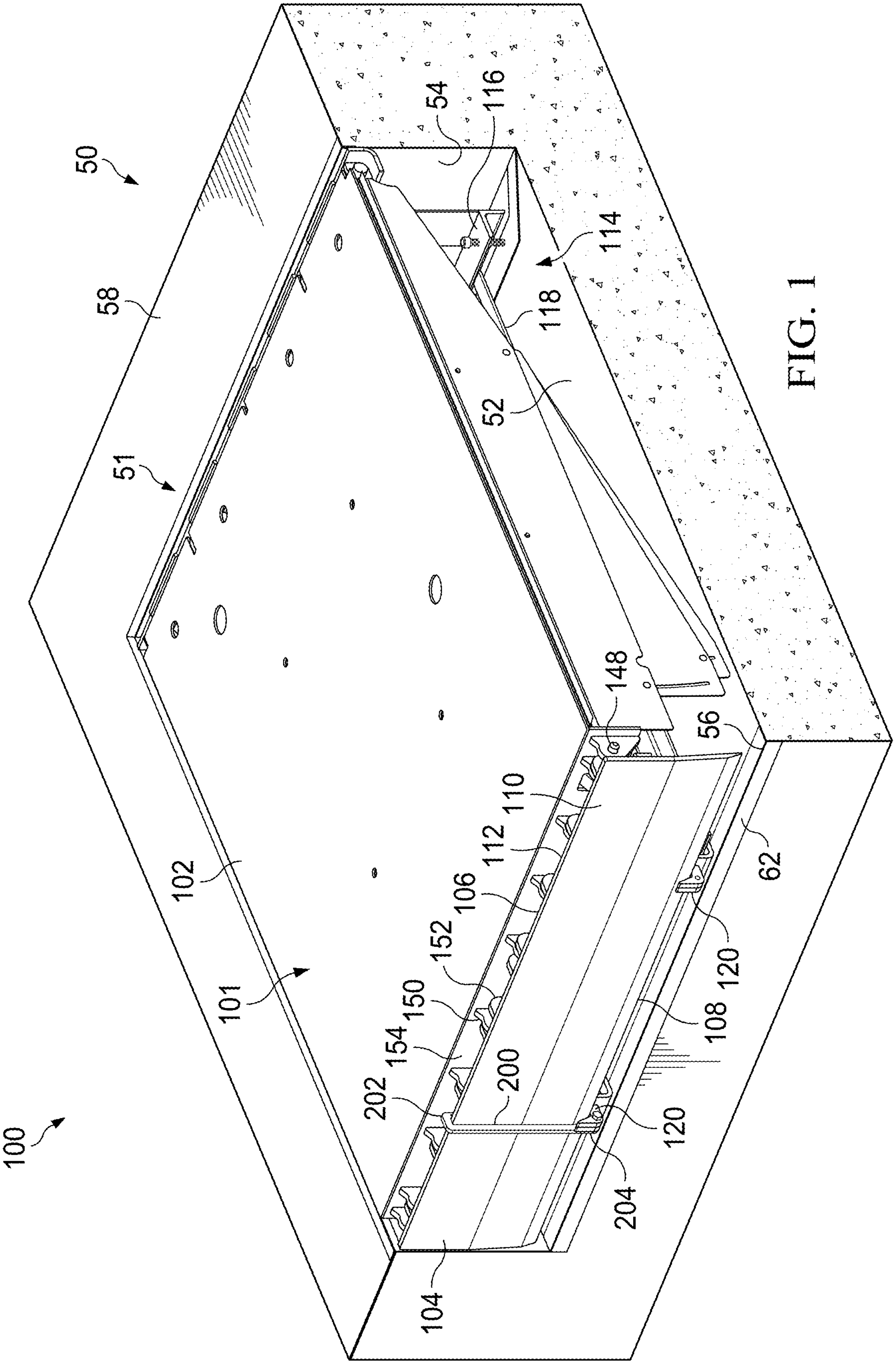
FIG. 1 is a perspective view of a dock leveler that is held in a stowed position by an exemplary hold-down bracket, according to some embodiments of the present disclosure.

These Figures will be better understood by reference to the following Detailed Description.

DETAILED DESCRIPTION

For promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

FIG. 1 illustrates a loading dock leveler 100 in a stowed position, according to some embodiments of the present disclosure. The loading dock leveler 100, also referred to as a dock leveler 100 herein, includes a bridge assembly 101 including a deck 102 and a lip 104. The dock leveler 100 also includes a frame 114 including a leg bracket assembly 116 and a chassis 118. The dock leveler 100 is installed on a loading dock 50 and more specifically within a dock pit 51 formed within the loading dock 50. In some embodiments, the dock leveler 100 is a pit dock leveler. However, in other embodiments, the dock leveler 100 described may be used in any dock-leveling application, including edge-of-dock, vertical loading, or other levelers or applications. Moreover, the illustrated embodiments may show a mechanical dock leveler; however, the disclosure is not intended to be so limited. Instead, the disclosure includes dock leveler actuated according to any suitable method, including hydraulicly-powered, air-powered, or otherwise powered dock levelers. For example, the dock leveler 100 may be one or more of the dock levelers described in U.S. application Ser. Nos. 18/332,535, 18/332,565, 18/332,585, 18/332,601, 18/733,517, 17/742,779, 18/332,564, and 18/332,591, the entirety of which are incorporated by reference herein.

Typically, the loading dock 50 is constructed of concrete and is large enough to accommodate one or more trailers or trucks side by side. For illustration purposes and ease of discussion, only one dock leveler 100 capable of operating with one trailer or truck is illustrated and described. However, it is understood that the loading dock may include more than one dock pit, each including a dock leveler 100 installed therein. Installation and use of the dock leveler 100 with a loading dock 50 constructed of materials other than concrete are contemplated herein and are not excluded by this description.

A pit 51 is formed in the dock 50 and the dock leveler 100 is sized and shaped to fit within the pit 51. The pit 51 includes a bottom surface 52, a back wall 54, a front edge 56 opposite the back wall 54. Two sides or sidewalls connect the front opening of the pit 51 with the back wall 54. In some embodiments, a curb angle 62 may be disposed on the front edge 56 of the pit 51.

The leg bracket assembly 116 of the frame 114 is disposed at the rear of the pit 51 along the back wall 54. The chassis 118 of the frame 114 is coupled to the leg bracket assembly 116 and is disposed on the bottom surface 52 of the pit 51. The deck 102 is pivotably or rotatably coupled to the leg bracket assembly 116. Thus, the leg bracket assembly 116 and chassis 118 may support the deck 102 and allow the deck 102 to rotate when in use between various positions including a stowed position (shown in FIG. 1) and a raised position in which the deck 102 is angled and/or extends upward relative to the top surface 58 of the loading dock 50.

A biasing mechanism (not shown) may be coupled to the frame 114 and the deck 102 to bias the deck 102 upwards towards the raised position. The biasing mechanism may also push, press, and/or bias the frame 114 downwards. In some embodiments, the biasing mechanism may be a lift arm assembly as described in U.S. application Ser. Nos. 18/332,535, 18/332,565, 18/332,585, 18/332,601, 18/733,517, 17/742,779, 18/332,564, and 18/332,591, the entirety of which are incorporated by reference herein.

The lip 104 may have a back or first end 106 and a front or second end 108. The first end 106 may be pivotably or rotatably coupled to a front end of the deck 102 via a lip hinge shaft 148. The lip hinge shaft 148 may be pivotably or rotatably coupled to the deck 102 via a plurality of deck support brackets 150 and to the lip 104 via a plurality of lip hinge lugs 152. The deck support brackets 150 may be coupled to a kicker plate 154 that is coupled to and extends downward from the front end of the deck 102. The deck support brackets 150 may each include a hole shaped and configured to receive the lip hinge shaft 148. The lip hinge lugs 152 may be coupled to a second side 112 of the lip at or below the first end 106 of the lip 104. The lip hinge lugs 152 may each include a hole shaped and configured to receive the lip hinge shaft 148. Thus, the lip hinge shaft 148 extends through the holes in the deck support brackets 150 and the lip hinge lugs 152 to pivotably or rotatably couple the lip 104 to the deck 102.

The lip 104 may rest on the edge of the truck or trailer such that the bridge assembly 101 creates a bridge between the truck and the top surface 58 of the dock 50 for unloading and/or loading of the truck. One or more lip keepers 120 may be coupled to, or may form a part of, the frame 114 and may be disposed at or proximate to the front edge 56 of the pit 51. When in the stowed position, the second end 108 of the lip 104 may rest in the lip keepers 120, as described in more detail below. A lip actuation assembly (not shown) may be coupled to the frame 114, the deck 102, and/or the lip 104 and may be configured to hold or move the lip 104 when in use from the stowed position into a raised position and/or engaged position. In some embodiments, the lip actuation assembly may be any of the lip actuation assemblies described in U.S. application Ser. Nos. 18/332,535, 18/332,565, 18/332,585, 18/332,601, 18/733,517, 17/742,779, 18/332,564, and 18/332,591, the entirety of which are incorporated by reference herein.

In the stowed position, the deck 102 is horizontal and flush with the top surface 58 of the loading dock 50. The lip 104 is vertical in the stowed position and, thus, is perpendicular to the deck 102 in the stowed position. The second end 108 of the lip 104 is disposed in or rests in the lip keepers 120.

A hold-down brace or bracket 200 is coupled to the dock leveler 100 to hold the dock leveler 100 in the stowed position. For example, when storing, shipping, and/or transporting the dock leveler 100, the hold-down bracket 200 may be coupled thereto to hold the dock leveler 100 in the stowed position and prevent the deck 102 and/or lip 104 from moving upward towards a raised position. Additionally, the hold-down bracket 200 may resist the downward force (e.g. gravitational force of the frame 114 when the dock leveler 100 is being moved in the stowed position. In some embodiments, the hold-down bracket 200 may include a top portion 202 and a bottom portion 204. The top portion 202 may be coupled to or hooked over the first end 106 of the lip 104. The bottom portion 204 may be coupled to a lip keeper 120. In some embodiments, the hold-down bracket 200 may resist the upward and/or downward biasing forces of the biasing mechanism of the dock leveler 100 to hold the dock leveler 100 in the stowed position and prevent upward movement of the deck 102 and/or downward movement of the frame 114.

Although only one hold-down bracket 200 is illustrated in FIG. 1, it should be understood that any suitable number of hold-down brackets 200 may be used. For example, two hold-down brackets 200 may be coupled to the dock leveler 100. In some embodiments, one hold-down bracket 200 is coupled to each lip keeper 120 and the first end 106 of the lip 104. In other embodiments, more than one hold-down bracket 200 are coupled to each lip keeper 120 and the first end 106 of the lip 104. Moreover, although only two lip keepers 120 are shown in FIG. 1, in other embodiments, the dock leveler 100 may include one lip keeper 120 or may include more than two lip keepers 120.

Figure 2:
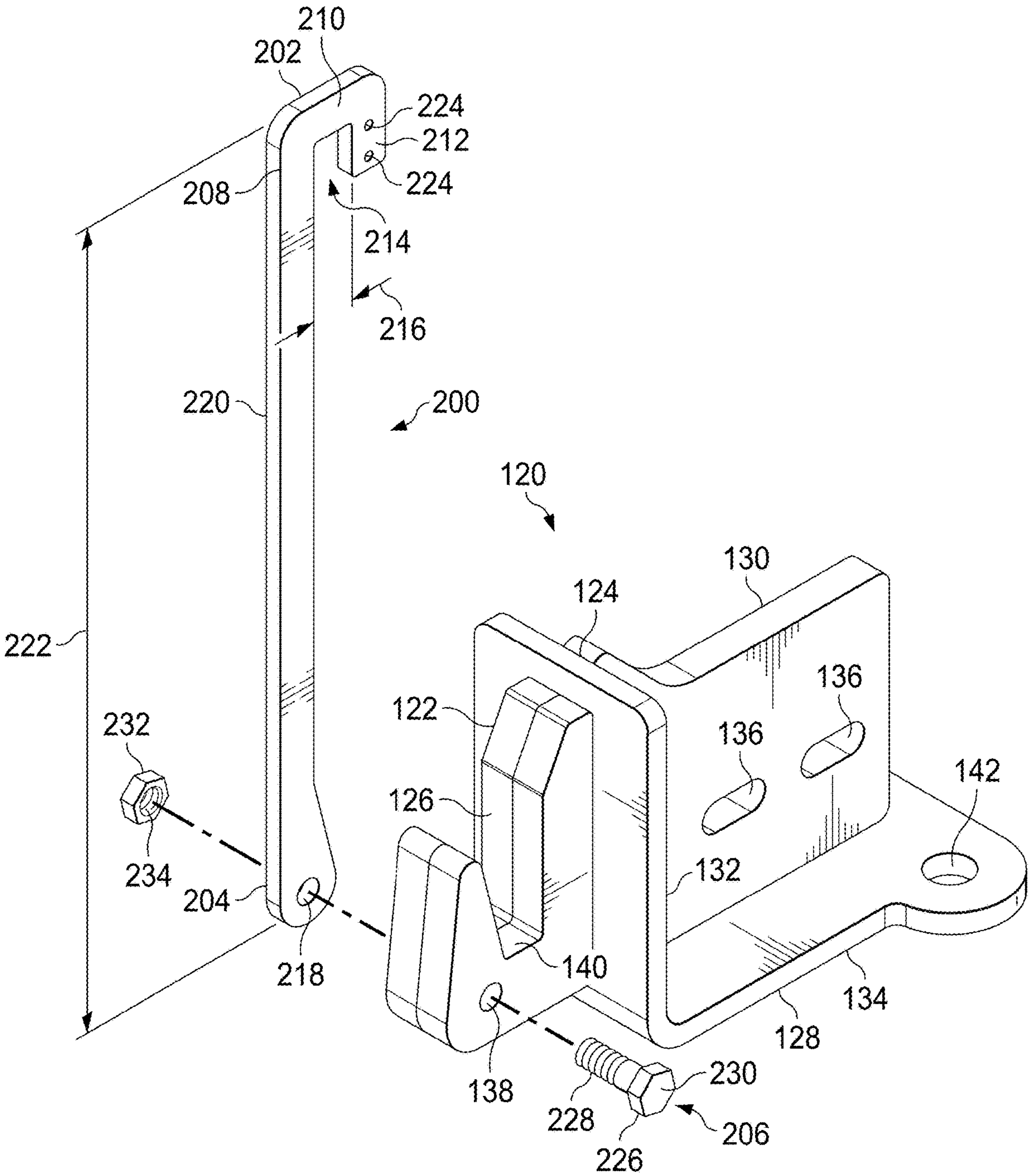
FIG. 2 is an exploded perspective view of an exemplary hold-down bracket, bolt-and-nut assembly, and lip keeper, according to some embodiments of the present disclosure.

FIG. 2 illustrates an exploded view of the hold-down bracket 200, nut-and-bolt assembly 206, and lip keeper 120, according to some embodiments of the present disclosure. The lip keeper 120 may include a lip holder 122 and an adjustment bracket 124. The lip holder 122 may be configured to contact and/or hold the second end 108 of the lip 104. Thus, the lip holder 122 includes a groove, divot, channel, or notch 126 that is configured to receive and couple to the front or second end 108 of the lip 104.

The lip holder 122 also includes a hold-down bracket hole 138. In some embodiments, the hold-down bracket hole 138 may be located forward relative to the notch 126. In some embodiments, the hold-down bracket hole 138 may also be located below the rest point or bottom 140 of the notch 126. In other embodiments, the hold-down bracket hole 138 may be longitudinally or horizontally aligned with the notch 126 or may be located backward relative to the notch 126. In yet other embodiments, the notch 126 may be vertically aligned with the bottom 140 of the notch 126 or may be located above the bottom 140 of the notch 126.

When the dock leveler 100 is in the stowed position, the lip 104 may rest in the notch 126 of the lip keeper 120 such that the weight of the lip 104 and/or deck 102 bears downward on the lip keeper 120. Thus, the lip keepers 120 may be configured to withstand the load of the lip 104 and/or deck 102. Moreover, when the hold-down bracket 200 is coupled to the lip 104 and lip keeper 120, the biasing mechanism of the dock leveler 100 may push upwards on the deck 102, which pushes upwards on the lip 104, which pushes upwards on the hold-down bracket 200. Thus, the hold-down bracket 200 may pull upwards or apply an upward force on the lip keeper 120 via the hold-down bracket hole 138. Additionally, the biasing mechanism of the dock leveler 100 may push downwards on the frame 114, which pushes downwards on the lip keeper 120. Therefore, the hold-down bracket hole 138 may be located such that it does not compromise the load bearing ability of the lip holder 122 and/or lip keeper 120. In other words, the hold-down bracket hole 138 is located such that it can counteract, resist, and/or withstand the upward forces from the hold-down bracket 200 and the downward forces from the frame 114 and lip 104 without the lip keeper 120 breaking.

The adjustment bracket 124 of the lip keeper 120 is coupled to the lip holder 122. In the illustrated embodiment, the adjustment bracket 124 includes an L-shaped bracket 128 and an adjustment plate 130. The L-shaped bracket 128 includes a vertical plate 132 and a horizontal plate 134. The front side of the adjustment plate 130 is coupled to the vertical plate 132 and the bottom of the adjustment plate 130 is coupled to the horizontal plate 134. The adjustment bracket 124 may include one or more slots 136. In the example shown, the slots 136 extend through the adjustment plate 130. The slots 136 may allow the lip keeper 120 to be longitudinally adjusted relative to the frame 114. For example, the slots 136 may allow the lip keeper 120 to be moved forward (towards or over the front edge 56 of the pit 51) and/or backward (towards the back wall 54 of the pit 51). Thus, the lip keepers 120 may allow the length of the frame 114 to be adjusted.

In some embodiments, the lip keepers 120 are welded to the bottom surface 52 of the pit 51. For example, the lip keepers 120 may be welded to the curb angle 62 that is welded to the front edge 56 of the pit 51. However, in some cases, the curb angle 62 on the front edge 56 of the pit 51 has been worn down and, thus, welding the lip keepers 120 to the curb angle 62 may be difficult. Thus, in some embodiments, the lip keepers 120 may be anchored to the bottom surface 52 of the pit 51 or to a part of the frame 114 of the dock leveler 100. For example, as in the illustrated embodiment, the horizontal plate 134 of the L-shaped bracket 128 of the adjustment bracket 124 of the lip keeper 120 may include an anchor hole 142 that is shaped to receive a bolt (not shown). The anchor hole 142 may be oriented such that the bolt can be screwed into the bottom surface 52 of the pit 51 to secure the lip keeper 120 thereto. In another example, a portion of the horizontal plate 134 may extend upwards and the anchor hole 142 may be disposed on that portion such that the anchor hole 142 is oriented sideways towards a portion of the frame 114. Thus, the anchor hole 142 may be shaped to receive a bolt such that the bolt can be attached to a part of the frame 114 (e.g. such as a longitudinal beam extending along the bottom 52 of the pit 51). In some embodiments, the anchor hole 142 for either example may be disposed towards the back portion of the horizontal plate 134 away from the vertical plate 132. However, the anchor hole 142 may be located at any suitable location on the horizontal plate 134.

In some embodiments, a lip keeper 120 may include two anchor holes 142, with one anchor hole 142 on each side of the adjustment plate 130. In other embodiments, the lip keeper 120 may include only one anchor hole 142 or more than two anchor holes 142. In some embodiments, the lip keeper 120 may include both an anchor hole 142 configured to attach to the bottom surface 52 of the pit 51 and an anchor hole 142 configured to attach to the frame 114 of the dock leveler 100. In some embodiments, one lip keeper 120 may have one or more anchor holes 142 configured to attach to the bottom surface 52 of the pit 51 and another lip keeper 120 may have one or more anchor holes 142 configured to attach to the frame 114 of the dock leveler 100. In some embodiments, the lip keepers 120 may each have either all anchor holes 142 configured to attach to the bottom surface 52 of the pit 51 or all anchor holes 142 configured to attach to the frame 114 of the dock leveler 100.

As explained above, the hold-down bracket 200 includes a top portion 202 configured to couple to a first end 106 of the lip 104 and a bottom portion 204 configured to couple to the lip keeper 120. In some embodiments, the hold-down bracket 200 is a single piece of material. Thus, a middle portion or main body 220 may extend between the top portion 202 and the bottom portion 204. The main body 220 may be generally vertical. In some embodiments, the length 222 of the hold-down bracket 200 may be equal to or greater than the length 146 of the lip 104 (shown in FIG. 4). In other embodiments, the length 222 of the hold-down bracket 200 may be less than the length 146 of the lip 104.

The top portion 202 may include a hook, as shown in the illustrated embodiment. The hook may include a first vertical portion 208, a second vertical portion 212, and a horizontal portion 210 that extends between the first vertical portion 208 and the second vertical portion 212. The first vertical portion 208 and second vertical portion 212 may be spaced from each other to form a gap 214 with the horizontal portion 210 extending across a top of the gap 214 to close off the top. Thus, the first vertical portion 208, horizontal portion 210, and second vertical portion 212 may form a J-shape or U-shape. The gap 214 between the first vertical portion 208 and the second vertical portion 212 may be configured to couple to or hook the first end 106 of the lip 104. Thus, a length 216 of the horizontal portion 210 (which may be the same as the length of the gap 214) may be equal to or greater than a thickness of the lip 104 or a thickness of the lip 104 at the first end 106. However, the top portion 202 may have any suitable shape. For example, the top portion 202 may be L-shaped hook such that it includes a vertical portion and a horizontal portion extending outward from the top of the vertical portion. In another example, the top portion 202 may be a T-shaped hook such that it includes a vertical portion and a horizontal portion extending outward from the top of the vertical portion in two opposing directions. Yet other shapes are contemplated.

The bottom portion 204 of the hold-down bracket 200 may include an attachment hole 218 extending therethrough. The attachment hole 218 may be sized and shaped to receive the bolt, as described in more detail below. The attachment hole 218 may be located on the bottom portion 204 such that it can be aligned with the hold-down bracket hole 138 on the lip keeper 120.

Moreover, as explained above, when the hold-down bracket 200 is coupled to the lip 104 and lip keeper 120, the biasing mechanism of the dock leveler 100 may push upwards on the deck 102, which pushes upwards on the lip 104, which pushes upwards on the hold-down bracket 200. Thus, the hold-down bracket 200 may pull upwards or apply an upward force on the lip keeper 120 via the hold-down bracket hole 138. Additionally, the biasing mechanism of the dock leveler 100 may push downwards on the frame 114, which pushes downwards on the lip keeper 120. Therefore, the attachment hole 218 may be located such that it does not compromise the load bearing ability of the hold-down bracket 200. In other words, the attachment hole 218 is located such that it can counteract or resist the upward forces from the lip 104 and deck 102 and the downward forces from the lip keeper 120 without the hold-down bracket 200 breaking. Thus, in some embodiments, a width and/or thickness of the bottom portion 204 may be greater than the width and/or thickness of other portions (e.g. top portion 202, main body 220) of the hold-down bracket 200 so that the bottom portion 204 may be able to bear additional load.

The hold-down bracket 200 may be any suitable length 222. For example, the hold-down bracket 200 may come in a variety of different lengths that correspond to a variety of different lengths of the lip 104. In some embodiments, the hold-down bracket 200 may include one or more indicators 224 that indicate the length 222 of the hold-down bracket 200. For example, in the illustrated embodiment, the indicators 224 are holes that are disposed on the second vertical portion 212 of the top portion 202. In the illustrated embodiment, there are two indicator holes 224. However, it should be understood that the hold-down bracket 200 may include any suitable number of indicator holes 224. For example, the hold-down bracket 200 may include one indicator hole 224 or more than two indicator holes 224. In some embodiments, the number of indicator holes 224 indicates the length 222 of the hold-down bracket 200. For example, one indicator hole 224 may indicate a smallest length 222 available of the hold-down bracket 200 (e.g. in a range of 15 and 20 inches, such as 18.3 inches), two indicator holes 224 may indicate a medium length 222 available of the hold-down bracket 200 (e.g. in a range of 18 and 23 inches, such as 20.3 inches), and three indicator holes 224 may indicate a longest length 222 of the hold-down bracket 200 (e.g. in a range of 20 and 25 inches, such as 22.3 inches). These lengths are example lengths only and larger and smaller ranges are contemplated for each of the indicated lengths, depending on the application and size of the dock leveler. In some embodiments, the only difference between each length 222 available of the hold-down bracket 200 is the length of the main body 220.

A person of skill in the art would understand that any suitable indicator or indicators may be used. For example, the indicator(s) 224 may be indentations, notches, or divots on hold-down bracket 200. In another example, the indicator (s) 224 may be painted or attached to the hold-down bracket 200. Moreover, the indicator(s) 224 may be disposed on any portion of the hold-down bracket 200. In other embodiments, the hold-down bracket 200 may not include any indicator(s) 224.

The hold-down bracket 200 may be attached to the lip keeper 120 in any suitable way. For example, as shown in the illustrated embodiment, the hold-down bracket 200 may be attached to the lip keeper 120 via a nut-and-bolt assembly 206 or other fastener. In some embodiments, a bolt 226 of the nut-and-bolt assembly 206 may include a shaft 228 and a head 230. The nut 232 of the nut-and-bolt assembly 206 may include an opening 234 sized and shaped to fit around the shaft 228 of the bolt 226. The shaft 228 of the bolt 226 and the opening 234 of the nut 232 may be threaded such that the nut 232 threadedly engages the bolt 226.

The shaft 228 of the bolt 226 may be sized and shaped to extend through the attachment hole 218 of the hold-down bracket 200 and the hold-down bracket hole 138 of the lip keeper 120. Thus, the attachment hole 218 may be aligned with the hold-down bracket hole 138 and the shaft 228 of the bolt 226 may extend through both holes 218, 138. The nut 232 may then threadedly engage the shaft 228 of the bolt 226 and be tightened until the hold-down bracket 200 is fixedly secured to the lip keeper 120. In some embodiments, when tightened, the head 230 of the bolt 226 may contact the hold-down bracket 200 around the attachment hole 218 and the nut 232 may contact the lip keeper 120 around the hold-down bracket hole 138. In other embodiments, the head 230 of the bolt 226 may contact the lip keeper 120 around the hold-down bracket hole 138 and the nut 232 may contact the hold-down bracket 200 around the attachment hole 218. Thus, the hold-down bracket 200 may be disposed on either side of the lip holder 122 of the lip keeper 120.

In some embodiments, one or more washers or spring washers (not shown) may be placed on the shaft 228 of the bolt 226 to distribute the load from the head 230 of the bolt 226 and/or the nut 232. In some embodiments, a washer and/or spring washer may be placed between the head 230 of the bolt 226 and the hold-down bracket 200 or lip keeper 120. In some embodiments, a washer and/or spring washer may be placed between the nut 232 and the hold-down bracket 200 or lip keeper 120.

Once the hold-down bracket 200 is no longer required for handling and/or once the dock leveler 100 is ready for installation or use, the hold-down bracket 200 may be removed to allow for movement of the dock leveler 100 (e.g. allow the deck 102 and/or lip 104 to move upwards and downwards via the biasing mechanism). For example, the hold-down bracket 200 may be removed before installation, during installation (when the dock leveler 100 is partially installed in the pit 51 of the dock 50), or after installation. Thus, although the bottom portion 204 of the hold-down bracket 200 is fixedly secured to the lip keeper 120, the coupler, fastener, or attachment mechanism is removeable so that the hold-down bracket 200 can be removed from the dock leveler 100.

Although a nut-and-bolt assembly 206 is described and illustrated, any suitable connector or attachment mechanism may be used to fixedly secure the hold-down bracket 200 to the lip keeper 120. In some embodiments, the hold-down bracket 200 and lip keeper 120 may not include holes 138, 218 and may instead include another connector. For example, the connector of the lip keeper 120 may be an indentation, notch, or divot and the connector of the hold-down bracket 200 may be a projection that fits within the indentation, notch, or divot of the lip keeper 120, or vice versa. In some embodiments, the connector of the hold-down bracket 200 and lip keeper 120 may be holes 218, 138, but the fastener may be a screw, a wire, a band, or another part that is inserted through the attachment hole 218 and hold-down bracket hole 138 to tie the hold-down bracket 200 to the lip keeper 120. In some embodiments, the hold-down bracket 200 and lip keeper 120 may not include a connector and may instead be coupled using another attachment mechanism. For example, the hold-down bracket 200 may be welded to the lip keeper 120 such that the welding is removeable. In another example, an adhesive may be used to attach the hold-down bracket 200 to the lip keeper 120.

Figure 3:
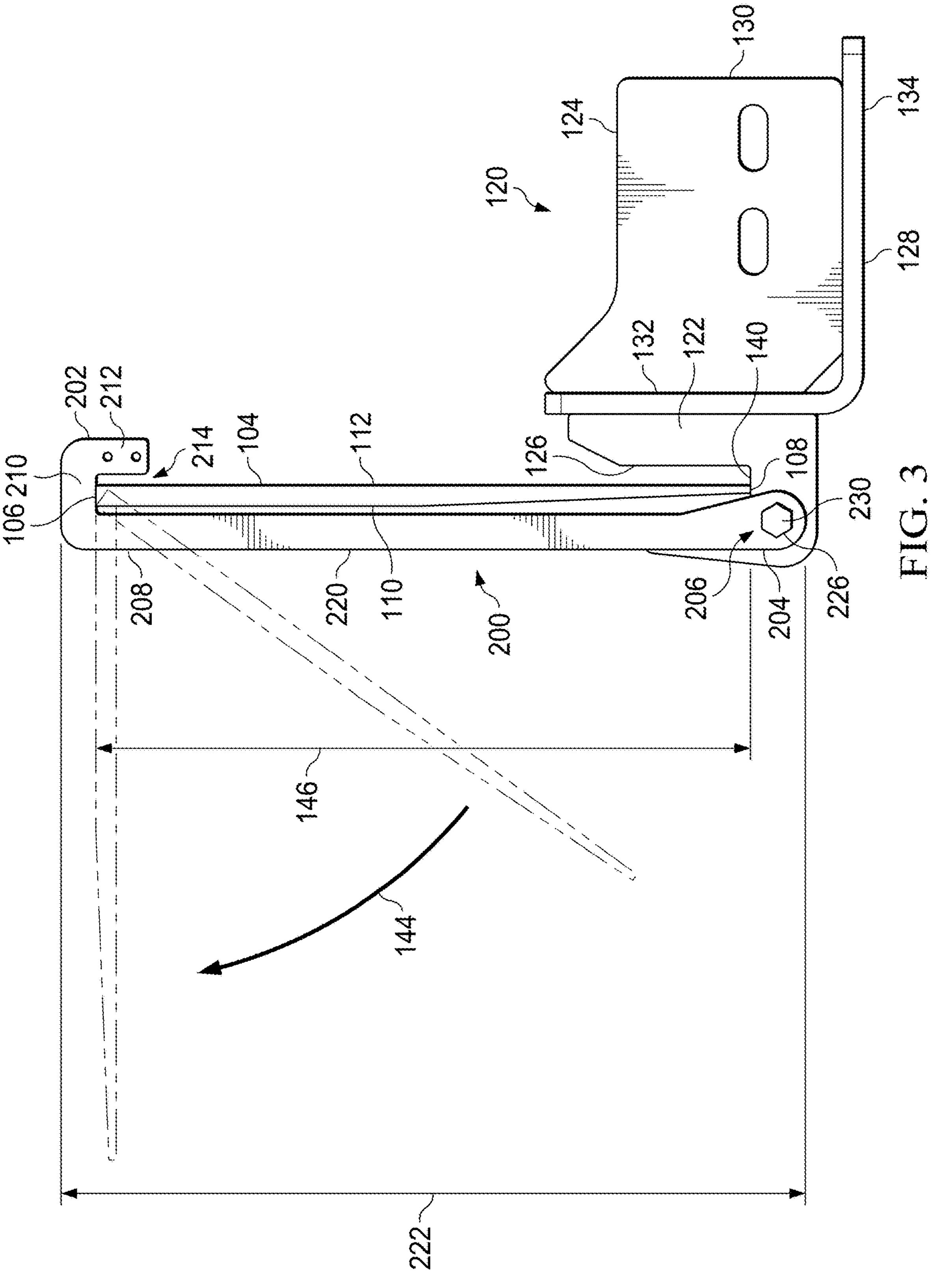
FIG. 3 is a zoomed-in cross-sectional side view of a lip of a dock leveler that is held in a stowed position by the hold-down bracket illustrated in FIG. 2, according to some embodiments of the present disclosure.

FIG. 3 is a zoomed-in cross-sectional side view of the hold-down bracket 200 coupled to the lip 104 of the dock leveler 100 such that the dock leveler 100 is held in a stowed position, according to some embodiments of the present disclosure. In the stowed position, the lip 104 is vertical such that the second end 108 of the lip 104 is disposed in and/or moveably coupled to the notch 126 of the lip holder 122. The second end 108 may contact, press, and/or bear downward against the bottom 140 of the notch 126.

However, the lip 104 may be configured to move, rotate, and/or pivot between a variety of positions between the vertical position and a horizontal or above horizontal position when in use. Thus, the lip 104 may have a range of motion or pivot range (illustrated by arrow 144) between the vertical position illustrated in solid lines in FIG. 3 and positions angled with respect to the vertical illustrated in dotted lines in FIG. 3. The hold-down bracket 200 may be coupled to the lip 104 and lip keeper 120 such that the main body 220 of the hold-down bracket 200 extends along the first side 110 of the lip 104 in the pivot range 144 of the lip 104. This may further prevent the lip 104 from extending upward during storage, shipping, and/or transportation.

In other embodiments, the hold-down bracket 200 may not be disposed in the pivot range 144 of the lip 104. For example, the hold-down bracket 200 may be coupled to the lip 104 and lip keeper 120 such that the main body 220 of the hold-down bracket 200 extends along the second side 112 of the lip 104 and, thus, not in the pivot range 144 of the lip 104. In this example, the hold-down bracket hole 138 may be disposed backward relative to the notch 126. That is, the bracket hole 138 may be disposed rearward of the notch 126, on the adjustment plate 130, or on the frame 114 itself.

The top portion 202 of the hold-down bracket 200 is coupled to the first end 106 of the lip 104. In some embodiments, the gap 214 of the top portion 202 is hooked onto the first end 106 of the lip 104 such that the first vertical portion 208 is disposed on a first side 110 of the lip 104 and the second vertical portion 212 is disposed on the second side 112 of the lip 104. The horizontal portion 210 extends over the top of the first end 106 of the lip 104. In some embodiments, the first end 106 contacts, engages, and/or presses against the horizontal portion 210. The first side 110 of the lip 104 may be spaced from or contact the first vertical portion 208. The second side 112 of the lip 104 may be spaced from or contact the second vertical portion 212.

In some embodiments, the top portion 202 may be couped to the first end 106 of the lip 104 but may not be fixedly secured thereto. For example, in the illustrated embodiment, the top portion 202 is coupled to the first end 106 of the lip 104 by hooking the first end 106 within the gap 214 of the top portion 202. No attachment mechanism may be used to fixedly secure the top portion 202 thereto (e.g. nut-and-bolt assembly, welding, screws, adhesive, etc.). Thus, the top portion 202 may be moveable relative to the first end 106.

In other embodiments, the top portion 202 of the hold-down bracket 200 may be coupled to another part of the dock leveler 100. Instead, the hold-down bracket 200 may be coupled to another part of the dock leveler 100 proximate the first end 106 of the lip 104.

For example, the top portion 202 may be configured to couple to the lip hinge shaft 148. The top portion 202 may include a hook similar to that shown in the illustrated embodiments herein that hooks around the lip hinge shaft 148. Moreover, in this example, the main body 220 of the hold-down bracket 200 may extend along the first side 110 of the lip 104 and hook both the first end 106 of the lip 104 and the lip hinge shaft 148 or may extend over the first end 106 of the lip 104 to hook only the lip hinge shaft 148. In some embodiments, the main body 220 of the hold-down bracket 200 may extend along the second side 112 of the lip 104 and hook only the lip hinge shaft 148 or both the first end 106 of the lip 104 and the lip hinge shaft 148.

In other examples, the top portion 202 of the hold-down bracket 200 may couple to a deck support bracket 150 and/or a lip hinge lug 152. In these examples, the top portion 202 may include a hook similar to that shown in the illustrated embodiments herein that hooks around a deck support bracket 150 and/or a lip hinge lug 152. In some embodiments, the hook of the top portion 202 may be rotated approximately 90 degrees such that it is perpendicular to the main body 220 and bottom portion 204 so that it can better hook the deck support bracket 150 and/or a lip hinge lug 152. In other embodiments, the top portion 202 of the hold-down bracket 200 may include an attachment hole that may couple to a corresponding hole on the deck support bracket 150 and/or a lip hinge lug 152 via an attachment mechanism like nut-and-bolt assembly 206. Thus, the top portion 202 may be similar to the bottom portion 204 shown in the illustrated embodiments herein.

In yet another example, the top portion 202 of the hold-down bracket 200 may couple to the kicker plate 154. In this example, the top portion 202 may include a hook similar to that shown in the illustrated embodiments herein that hooks around a top of the kicker plate 154 if, for example, there is a space between the kicker plate 154 and the front end of the deck 102. In other embodiments, the top portion 202 of the hold-down bracket 200 may include an attachment hole that may couple to a corresponding hole on the kicker plate 154 via an attachment mechanism like nut-and-bolt assembly 206. Thus, the top portion 202 may be similar to the bottom portion 204 shown in the illustrated embodiments herein.

In yet another example, the top portion 202 of the hold-down bracket 200 may couple to the deck 102. In this example, the top portion 202 may include an L-shaped hook (with one vertical portion and one horizontal portion) that hooks over the front end of the deck such that the horizontal portion contacts, engages, or presses against the top of the deck 102. In other embodiments, the top portion 202 of the hold-down bracket 200 may include an attachment hole that may couple to a corresponding hole on the deck 102 via an attachment mechanism like nut-and-bolt assembly 206. Thus, the top portion 202 may be similar to the bottom portion 204 shown in the illustrated embodiments herein.

The hold-down bracket 200 may be moved such that the attachment hole 218 of the bottom portion 204 aligns with the hold-down bracket hole 138 of the lip keeper 120. When moving the hold-down bracket 200, the top portion 202 may be moved, rotated, and/or pivoted relative to the first end 106 of the lip 104. Once the attachment hole 218 is aligned with the hold-down bracket hole 138, the nut-and-bolt assembly 206 is used to fixedly secure the bottom portion 204 of the hold-down bracket 200 to the lip keeper 120. As explained above, the nut 232 may threadedly engage the shaft 228 of the bolt 226 to tighten the head 230 of the bolt 226 and the nut 232 against the hold-down bracket 200 and lip keeper 120, respectively (or vice versa). When the bottom portion 204 of the hold-down bracket 200 is attached to the lip keeper 120, this may result in the top portion 202 of the hold-down bracket 200 being pulled and/or pressed against the first end 106 of the lip 104 with sufficient force such that the top portion 202 is stabilized and/or secured against the first end 106. In some embodiments, when the bottom portion 204 of the hold-down bracket 200 is attached to the lip keeper 120, the top portion 202 may not be moveable, rotatable, and/or pivotable relative to the first end 106. Thus, this prevents the lip 104 from moving upwards, thereby preventing the deck 102 attached thereto from moving upwards. Therefore, the hold-down bracket 200 holds the dock leveler 100 in a stowed position.

Figure 4:
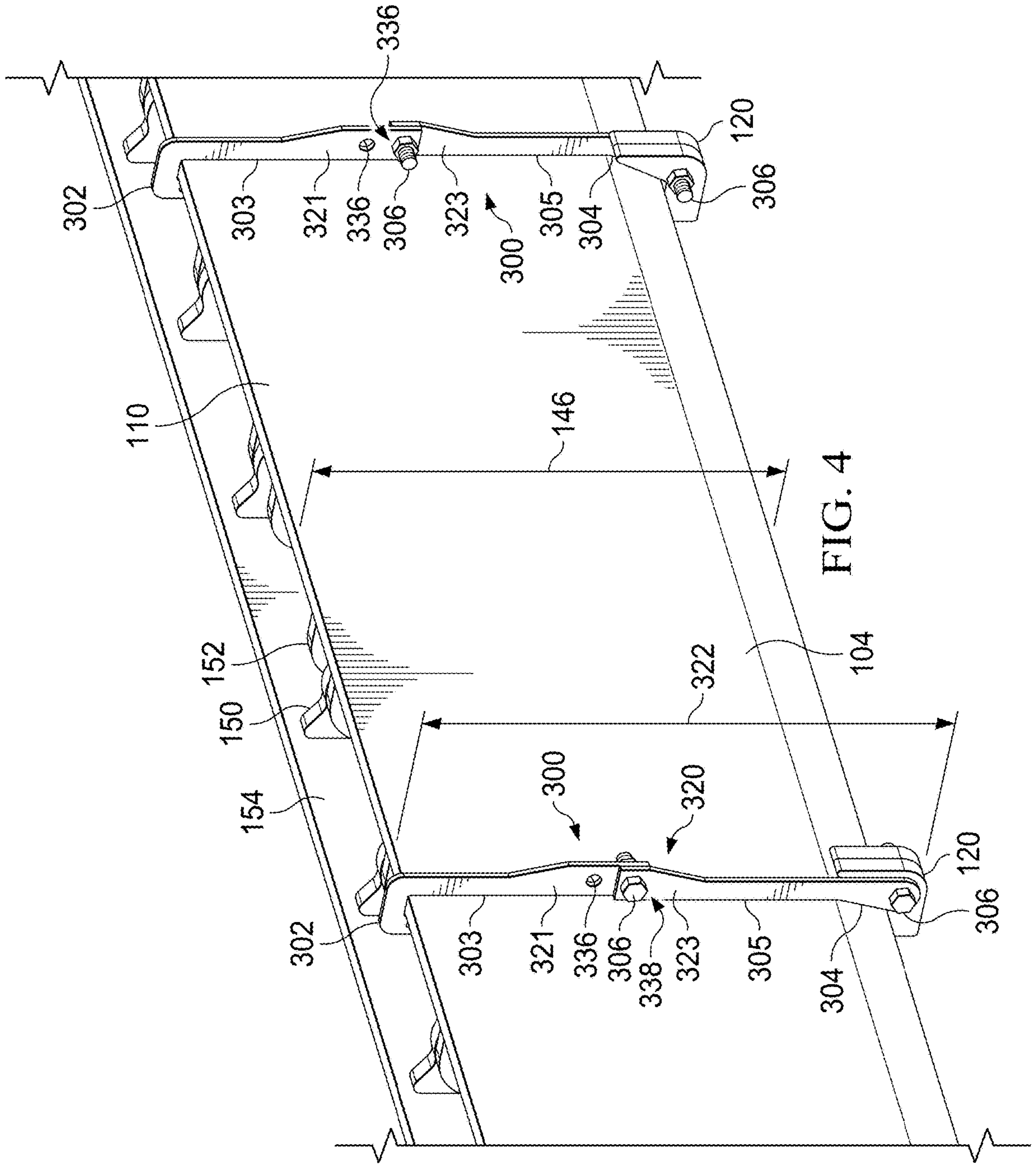
FIG. 4 is a zoomed-in perspective view of a dock leveler that is held in a stowed position by another exemplary hold-down bracket, according to some embodiments of the present disclosure.

In some embodiments, the hold-down bracket may be adjustable between one or more lengths. FIG. 4 illustrates a zoomed-in perspective view of an adjustable hold-down bracket 300 coupled to a dock leveler 100 such that the dock leveler 100 is held in a stowed position, according to some embodiments of the present disclosure. The adjustable hold-down bracket 300 includes a top portion 302 and a bottom portion 304. The top portion 302 of the adjustable hold-down bracket 300 illustrated in FIG. 4 may be the same as the top portion 202 of the non-adjustable hold-down bracket 200 illustrated in FIG. 2. Moreover, the bottom portion 304 of the adjustable hold-down bracket 300 illustrated in FIG. 4 may be the same as the bottom portion 204 of the non-adjustable hold-down bracket 200 illustrated in FIG. 2.

However, unlike the non-adjustable hold-down bracket 200 illustrated in FIG. 2, the adjustable hold-down bracket 300 illustrated in FIG. 4 includes two separate pieces. In some embodiments, a main body 320 of the adjustable hold-down bracket 300 is split between the two pieces 303, 305. Thus, a top piece 303 of the adjustable hold-down bracket 300 includes the top portion 302 and a first part 321 of the main body 320. Moreover, a bottom piece 305 of the adjustable hold-down bracket 300 includes the bottom portion 304 and a second part 323 of the main body 320.

In some embodiments, the first part 321 of the main body 320 of the top piece 303 includes a plurality of first adjustment holes 336. For example, as shown in the illustrated embodiment the first part 321 includes two first adjustment holes 236. However, in other embodiments, the first part 321 may include more than two first adjustment holes 236. The first adjustment holes 236 may be longitudinally spaced along the length of the first part 321 of the main body 320. In some embodiments, the second part 323 of the main body 320 includes one second adjustment hole 338, as shown in the illustrated embodiment. Depending on the desired length, the second adjustment hole 338 of the second part 323 of the main body 320 may be aligned with one of the first adjustment holes 336 of the first part 321 of the main body 320. For example, if the second adjustment hole 338 is aligned with the top first adjustment hole 336, the length 322 of the adjustable hold-down bracket 300 may be the shortest length (e.g. in a range of 18-23 inches, such as 20.3 inches). If the second adjustment hole 338 is aligned with the bottom first adjustment hole 336, the length 322 of the adjustable hold-down bracket 300 may be the longest length (e.g. in a range of 20-25 inches, such as 22.3 inches). These lengths are example lengths only and larger and smaller ranges are contemplated for each of the indicated lengths, depending on the application and size of the dock leveler. The desired length of the adjustable hold-down bracket 300 may be determined based on the length 146 of the lip 104.

The selected first adjustment hole 336 and second adjustment hole 338 may be attached using a nut-and-bolt assembly 306 like the nut-and-bolt assembly 206 shown in FIG. 2 that is used to secure the bottom portion 204 of the non-adjustable hold-down bracket 200 to the lip keeper 120. Thus, the same nut-and-bolt assembly 306 may be used to attach the bottom portion 304 of the adjustable bracket 300 to the lip keeper 120. In other embodiments, any suitable attachment mechanism or connector may be used to couple the first piece 303 to the second piece 305, including, for example, welding, one or more screws, adhesive, wire, bands, or threads.

In some embodiments, the single adjustment hole may be disposed on the first part 321 of the main body 320 and the plurality of adjustment holes may be disposed on the second part 323 of the main body 320. In some embodiments, both parts 321, 323 of the main body 320 include a plurality of adjustment holes. In some embodiments, the width and/or thickness of the main body 320 around the adjustment holes 336, 338 may be greater than the width and/or thickness of other portions (e.g. top portion 302, other parts of main body 320) of the adjustable hold-down bracket 300 so that the part of the main body 320 around the adjustment holes 336, 338 may be able to bear additional load. Because the hold-down bracket 300 in FIG. 4 is adjustable, it may not include indicators like the non-adjustable hold-down bracket 200 in FIG. 2.

Figure 5:
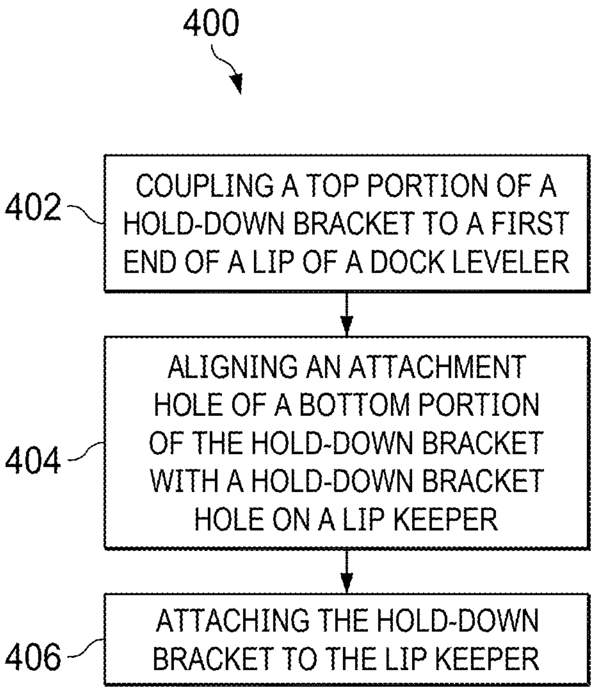
FIG. 5 is a flow chart illustrating a method of holding a dock leveler in a stowed position using a hold-down bracket, according to some embodiments of the present disclosure.

FIG. 5 illustrates a flow chart of a method 400 for coupling a hold-down bracket to a dock leveler to hold the dock leveler in a stowed position, according to some embodiments of the present disclosure. Any suitable hold-down bracket described herein may be used, including the non-adjustable hold-down bracket 200 shown in FIGS. 2-3 or the adjustable hold-down bracket 300 shown in FIG. 4.

When using the adjustable hold-down bracket 300, the method 400 may include an additional step of securing the top piece 303 of the hold-down bracket 300 to the bottom piece 305. In some embodiments, the single second adjustment hole 338 on the bottom piece 305 may be aligned with one of the first adjustment holes 336 on the top piece 303. The first adjustment hole 336 may be selected based on the desired length 322 of the hold-down bracket 300, as described in more detail above. The adjustment holes 336, 338 may be attached via a nut-and-bolt assembly 306 or any suitable connector or attachment mechanism described herein. The step of coupling the pieces 303, 305 of the adjustable hold-down bracket 300 may be performed at any suitable point in the method 400. For example, this step may be performed before step 402 or after step 406 (both described below).

Although steps 402-406 may be performed using the adjustable hold-down bracket 300 in FIG. 4, these steps will be described in reference to the non-adjustable hold-down bracket shown in FIGS. 2-3.

Step 402 of the method 400 may include coupling a top portion 202 of a hold-down bracket 200 to a first end 106 of the lip 104. This may include hooking the gap 214 of the top portion 202 onto the first end 106 of the lip 104. In some embodiments, a first vertical portion 208 may be disposed on a first side 110 of the lip 104 and a second vertical portion 212 may be disposed on a second side 112 of the lip 104. The horizontal portion 210 may extend over the top of the first end 106. In some embodiments, the first end 106 of the lip 104 may contact, engage, and/or press against the horizontal portion 210. In some embodiments, the top portion 202 may be moveable, rotatable, and/or pivotable relative to the first end 106 of the lip 104 after the top portion 202 is hooked or coupled thereto.

Step 404 of the method 400 may include aligning an attachment hole 218 of a bottom portion 204 of the hold-down bracket 200 with a hold-down bracket hole 138 of the lip keeper 120. In some embodiments, the top portion 202 and/or main body 220 may be moved, rotated, and/or pivoted to align the attachment hole 218 with the hold-down bracket hole 138. For example, once the top portion 202 is hooked or coupled to the first end 106 of the lip 104, the hold-down bracket 200 may be rotated by rotating the top portion 202 about the first end 106 such that the bottom portion 204 is moved closer to the lip keeper 120.

In some embodiments, steps 402 and 404 may be performed simultaneously. For example, the hold-down bracket 200 may be moved from a position above the lip 104 downward such that the hook of the top portion 202 hooks onto the first end 106 of the lip 104 as the attachment hole 218 of the bottom portion 204 aligns with the hold-down bracket hole 138 on the lip keeper 120.

Step 406 of the method 400 may include securing or attaching the hold-down bracket 200 to the lip keeper 120. In some embodiments, the hold-down bracket 200 is attached to the lip keeper 120 via a nut-and-bolt assembly 206. The shaft 228 of the bolt 226 may be inserted through the attachment hole 218 of the hold-down bracket 200 and the hold-down bracket hole 138 of the lip keeper 120. The nut 232 may be thread onto the shaft 228 of the bolt 226 and may be tightened to secure the hold-down bracket 200 to the lip keeper 120. One or more washers or spring washers may be used as described above. Moreover, as described above, any suitable connector or attachment mechanism may be used to attach the hold-down bracket 200 to the lip keeper 120, including, for example, welding, one or more screws, adhesive, wire, bands, or threads.

In some embodiments, the hold-down bracket 200, 300 may be coupled to the lip 104 and lip keeper 120 before the dock leveler 100 is shipped, transported, or stored. The hold-down bracket 200 may then be removed when the hold-down bracket 200, 300 is no longer required for handling and/or once the dock leveler 100 is ready for installation or use. In some embodiments, the hold-down bracket 200, 300 may be removed before or after installing the dock leveler 100 within the pit 51 of the dock 50. In some embodiments, the hold-down bracket 200, 300 may be removed after at least partially installing the dock leveler 100 in the pit 51 of the dock 50. Thus, the hold-down bracket 200, 300 may be removed before operating the dock leveler 100.

The hold-down bracket 200, 300 may be formed using any suitable material. For example, the hold-down bracket 200, 300 may be formed of sheet metal, which may include one or more of stainless steel, aluminum, brass, copper, steel, tin, nickel, or titanium. In other embodiments, the hold-down bracket 200, 300 may be formed of plastic such as acrylonitrile butadiene styrene (ABS), high density polyethylene (HDPE), polycarbonate (PC), polyvinyle chloride (PVC), polytetrafluoroethylene (PTFE), nylon 66, or polyether ether ketone (PEEK). The hold-down bracket 200, 300 may be formed by any suitable process. For example, the hold-down bracket 200, 300 may be laser cut, 3D printed, cast, molded, stamped, or forged.

In some embodiments, the hold-down bracket 200, 300 may have a main body formed of a cable, a strap, or a wire in place of the sheet metal shown herein. The shipping cable, strap, or wire bracket may couple to the lip keeper 120 and the first end 106 of the lip 104 or any other part of the dock leveler 100 (e.g. lip hinge shaft 148, deck support bracket 150, lip hinge lug 152, kicker plate 154, or deck 102). In some implementations, instead of being in front of the lip as shown in the Figures, the bracket is behind the lip and extends between the deck 102 and the lip 104.

Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A bracket for holding a dock leveler in a stowed position, comprising:
- a top portion comprising a hook shaped to couple proximate to a top end of a lip of the dock leveler when the lip is in the stowed position;
- a bottom portion configured to couple to a lip keeper or a frame of the dock leveler; and
- a main body extending between the top portion and the bottom portion, the main body configured to span a length of the lip to hold the dock leveler in the stowed position.

2. The bracket of claim 1, wherein the bracket comprises a single piece.

3. The bracket of claim 2, wherein the bottom portion comprises a hole shaped to receive a fastener usable to secure the bottom portion to the lip keeper or frame.

4. The bracket of claim 1, wherein the bracket comprises:
- a first piece comprising the top portion and a first part of the main body; and
- a second piece comprising the bottom portion and a second part of the main body.

5. The bracket of claim 4, wherein one of the first piece or the second piece comprises a first adjustment hole and the other of the first piece or second piece comprises a plurality of second adjustment holes.

6. The bracket of claim 5, wherein the first adjustment hole is couplable to a second adjustment hole of the plurality of second adjustment holes by a bolt and a nut.

7. The bracket of claim 5, wherein each second adjustment hole of the plurality of second adjustment holes is longitudinally spaced from the other second adjustment holes of the plurality of second adjustment holes.

8. The bracket of claim 1, wherein the hook comprises a first vertical portion, a second vertical portion, and a horizontal portion extending between the first vertical portion and the second vertical portion such that the first vertical portion is spaced from the second vertical portion.

9. The bracket of claim 8, wherein a length of the horizontal portion is greater than a thickness of the lip.

10. The bracket of claim 1, wherein the top portion comprises one or more indicators indicating a length of the bracket.

11. The bracket of claim 10, wherein the one or more indicators are indicator holes.

12. The bracket of claim 1, wherein the main body is one of a sheet metal, a strap, a wire, or a cable.

13. A system, comprising:
- a dock leveler, comprising:
  - a lip comprising a first end and an opposite second end;
  - a lip keeper comprising a lip holder, the lip keeper being attached to a frame of the dock leveler, the lip keeper or frame having a first connector; and
  - a biasing mechanism that biases the dock leveler upward into an extended position; and
- a bracket configured to maintain the dock leveler in a stowed position, the bracket comprising:
  - a top portion comprising a hook coupled proximate to the first end of the lip; and
  - a bottom portion comprising a second connector cooperative with the first connector to couple the bracket to the lip keeper or frame.

14. The system of claim 13, wherein the lip keeper comprises a notch configured to couple to the second end of the lip, and wherein the first connector is located forward of the notch.

15. The system of claim 14, wherein the first connector is located below a bottom of the notch.

16. The system of claim 13, wherein the second connector of the bottom portion of the bracket is coupled to the first connector of the lip keeper or the frame via a nut and a bolt.

17. The system of claim 13, wherein the hook of the top portion of the bracket comprises a first vertical portion, a second vertical portion, and a horizontal portion extending between the first vertical portion and the second vertical portion such that the first vertical portion is spaced from the second vertical portion.

18. The system of claim 17, wherein a length of the horizontal portion is greater than a thickness of the lip.

19. The system of claim 18, wherein the first vertical portion is disposed on a first side of the lip and the second vertical portion is disposed on a second side of the lip such that the horizontal portion extends across the first end of the lip.

20. A method of holding a dock leveler in a stowed position, comprising:
- coupling a top portion of a bracket at a location proximate to a first end of a lip of the dock leveler, wherein the top portion of the bracket comprises a hook that hooks proximate to the first end of the lip;
- aligning a first connector of a bottom portion of the bracket with a second connector on a lip keeper or a frame of the dock leveler, and wherein the lip keeper or the frame is engaged with a second end of the lip; and
- securing the bottom portion of the bracket to the lip keeper or the frame using the first connector of the bottom portion and the second connector of the lip keeper or frame.

21. The method of claim 20, wherein coupling the top portion of the bracket at the location proximate to the first end of the lip comprises non-fixedly securing the top portion of the bracket to the first end of the lip, and wherein securing the bottom portion of the bracket to the lip keeper or frame comprises fixedly securing the bottom portion of the bracket to the lip keeper or frame.

22. The method of claim 20, wherein the first connector and the second connector are holes.

* * * * *